Aug. 23, 1960   J. E. ASHWORTH   2,950,150
LUBRICATED ROLL
Filed Feb. 14, 1958
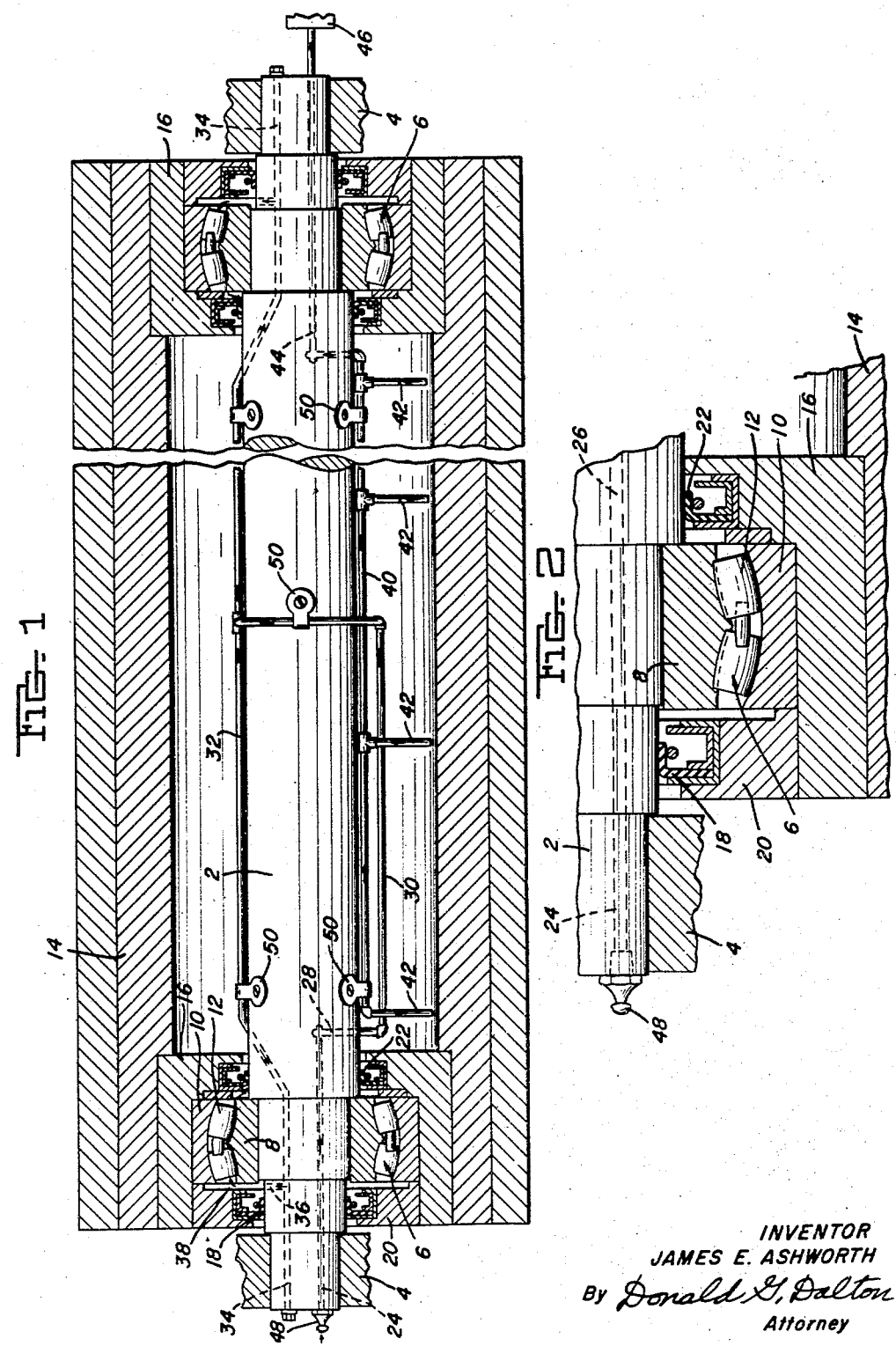
INVENTOR
JAMES E. ASHWORTH
By Donald G. Dalton
Attorney 2,950,150

LUBRICATED ROLL

James E. Ashworth, Palo Alto, Calif., assignor to United States Steel Corporation, a corporation of New Jersey Filed Feb. 14, 1958, Ser. No. 715,361

2 Claims. (Cl. 308—187)

This invention relates to a roll and more particularly to a lubricated roll where it is desirable that the lubricant be prevented from leaking from the roll. In handling strip which passes over rolls it is often necessary that the strip remain clean and free from oil. When passing over lubricated rolls the oil or grease often leaks outwardly and contacts the strip. For example, in cleaning operations a roll located in the cleaning fluid might leak oil outwardly into the cleaning fluid and some of this oil will eventually collect on the strip. If the strip is then to be coated such as by electrolytic tinning, the coating will not adhere properly to the strip.

It is therefore an object of my invention to provide a lubricating roll wherein the lubricant is prevented from leaking outwardly from the roll.

This and other objects will be more apparent after referring to the following specification and attached drawing, in which:

Figure 1 is a longitudinal sectional view through the roll of my invention; and

Figure 2 is an enlarged sectional view of a detail.

Referring more particularly to the drawings, reference numeral 2 indicates a stationary shaft which has its ends mounted in supports 4. Bearings 6 are mounted on the shaft 2 adjacent its ends. Each of the bearings 6 has an inner race 8 and an outer race 10 with rollers 12 therebetween. The invention is applicable when using ball bearings as well as when using roller bearings. A roll body 14 is spaced from the shaft 2 by means of webs 16, one mounted for rotation on each of the outer races 10. A suitable seal 18 bears against the shaft 2 on the outer side of each bearing 6. A ring 20 attached to the web 16 holds the seal 18 in place. A second seal 22 bears against the shaft 2 on the inner side of each bearing 6. A drilled hole 24 is provided in the left hand end of shaft 2 as seen in Figure 1. A drilled hole 28 intersects hole 24 at a 90° angle and passes radially outwardly to the outside of shaft 2. Piping 30, connected to drilled hole 28, leads to a manifold 32 which has two branches, one leading to each of the bearings 6. Each branch of the manifold extends into an opening 34 at each end of the shaft 2. A radial opening 36 extends outwardly from each opening 34 to a space 38 between the seal 18 and bearing 6. A second manifold 40 is mounted below the shaft 2 and is provided with vertical siphon jets 42 at spaced intervals. Manifold 40 passes through an opening 44 in the right end of shaft 2 as seen in Figure 1 and is connected to a vacuum pump 46. A lubrication fitting 48 is attached to the outer end of drilled hole 24. Clips 50 may be utilized to hold the manifolds 32 and 40 in place on shaft 2.

The operation of my device is as follows:

The lubricant is delivered to the manifold 32 through fitting 48, drilled holes 24 and 28, and piping 30. The lubricant passes outwardly through the openings 36 and 38 to the rollers 12 and then in the direction shown by the arrows to the seal 22. It will be noted that the seals 18 and 22 are so arranged that leakage outwardly is more difficult than leakage inwardly. Thus, the lubricant is much more likely to pass through the seal 22 into the space between shaft 2 and roll body 14, then outwardly through seal 18. This lubricant and any liquid which may leak through the seals 18 and 22 from the outside of the roll will collect beneath the shaft 2. A slight vacuum is created in this space by means of vacuum pump 46, thus helping to draw the lubricant inwardly from the outside of bearings 6 into the inner portion of the roll and then outwardly through the jets 42 and manifold 40.

While one embodiment of my invention has been shown and described it will be apparent that other adaptations and modifications may be made without departing from the scope of the following claims.

I claim:

1. A roll comprising a shaft, a bearing adjacent each end of said shaft, a seal on the outer side of each bearing, a roll body mounted on said bearings in spaced relationship with said shaft, means for delivering a lubricant to said bearings, and separate means for creating a partial vacuum in the space between said shaft and roll body.

2. A roll comprising a shaft, a bearing adjacent each end of said shaft, a seal on each side of each bearing in contact with said shaft, a roll body mounted on said bearings in spaced relationship with said shaft, means for delivering a lubricant to said bearings, a manifold in the space between said shaft and roll body, pipes connected to said manifold with outlets below said shaft, and separate means for applying suction to said manifold.

References Cited in the file of this patent

UNITED STATES PATENTS

| 1,655,355 | Pfleegor | Jan. 3, 1928 |
| 1,847,817 | Cole | Mar. 1, 1932 |
| 2,610,096 | Mallory | Sept. 9, 1952 |
| 2,664,173 | Karig | Dec. 29, 1953 |
| 2,827,342 | Roach | Mar. 18, 1958 |

FOREIGN PATENTS

| 473,849 | Italy | Apr. 14, 1952 |